US012722917B2

(12) United States Patent
Dekervel et al.

(10) Patent No.: US 12,722,917 B2
(45) Date of Patent: Sep. 1, 2026

(54) FEEDER MODULE

(71) Applicant: BOBST MEX SA, Mex (CH)

(72) Inventors: Arnaud Dekervel, Thonon-les-bains (FR); Eric Krebs, Lausanne (CH)

(73) Assignee: BOBST MEX SA, Mex (CH)

( * ) Notice: Subject to any disclaimer, the term of this patent is extended or adjusted under 35 U.S.C. 154(b) by 0 days.

(21) Appl. No.: 18/911,568

(22) Filed: Oct. 10, 2024

(65) Prior Publication Data

US 2025/0122035 A1 Apr. 17, 2025

(30) Foreign Application Priority Data

Oct. 13, 2023 (EP) .................................... 23203592

(51) Int. Cl.

| | |
|---|---|
| ***B65H 1/06*** | (2006.01) |
| ***B41F 21/00*** | (2006.01) |
| ***B65H 3/04*** | (2006.01) |
| ***B65H 3/06*** | (2006.01) |
| ***B65H 3/56*** | (2006.01) |
| ***B65H 5/06*** | (2006.01) |
| ***B65H 5/22*** | (2006.01) |
| ***B65H 7/00*** | (2006.01) |

(52) U.S. Cl.

CPC ............... *B65H 1/06* (2013.01); *B41F 21/00* (2013.01); *B65H 3/042* (2013.01); *B65H 5/062* (2013.01); *B65H 5/222* (2013.01); *B65H 7/00* (2013.01); *B65H 2301/44318* (2013.01); *B65H 2301/44322* (2013.01); *B65H 2301/4435* (2013.01); *B65H 2403/52* (2013.01); *B65H 2801/21* (2013.01)

(58) Field of Classification Search

CPC .......... B65H 1/06; B65H 3/042; B65H 3/063; B65H 3/126; B65H 3/56; B65H 3/523; B65H 5/062; B65H 2301/42322; B65H 2511/13; B65H 2511/224; B41F 21/00

See application file for complete search history.

(56) References Cited

U.S. PATENT DOCUMENTS

| | | | |
|---|---|---|---|
| 3,907,278 | A | 9/1975 | Jaton |
| 4,470,592 | A | 9/1984 | Takahashi |
| 4,961,566 | A | 10/1990 | Labombarde |
| 5,074,539 | A | 12/1991 | Wells et al. |
| 5,531,432 | A | 7/1996 | Sardella |

(Continued)

FOREIGN PATENT DOCUMENTS

| | | | |
|---|---|---|---|
| DE | 10219982 | C1 | 7/2003 |
| EP | 2408698 | B1 | 1/2012 |
| JP | 2000219338 | A * | 8/2000 |

*Primary Examiner* — Luis A Gonzalez

(74) *Attorney, Agent, or Firm* — Bookoff McAndrews, PLLC

(57) ABSTRACT

The present invention relates to a feeder module for a converting machine, the feeder module comprises an upper feeder assembly, and a lower feeder assembly comprising a loading surface configured to receive a stack of sheets. The upper feeder assembly (20) comprises a gauge (32), wherein a distance (d1) between a vertical distal end of the gauge and the loading surface defines a clearance through which a lowermost positioned sheet in the stack can pass at a time. A feed roll assembly (34) located downstream of the gauge comprises an upper feed roller (35*a*) and a lower feed roller (35*b*). The lower feeder assembly (22) and the lower feed roller are displaceable in the vertical direction.

8 Claims, 10 Drawing Sheets

(56) References Cited

U.S. PATENT DOCUMENTS

| | | | | |
|---|---|---|---|---|
| 6,418,847 | B1 * | 7/2002 | Holecek | B65H 3/042<br>101/232 |
| 2007/0145664 | A1 * | 6/2007 | Sardella | B65H 3/063<br>271/10.08 |

* cited by examiner

FEEDER MODULE

CROSS-REFERENCE TO RELATED APPLICATION(S)

This patent application claims the benefit of priority to European Application No. 23203592.3, filed on Oct. 13, 2023, the entirety of which is incorporated herein by reference.

FIELD OF THE INVENTION

The present invention relates to a feeder module for a converting machine, such as a rotary printing press. The present invention also relates to converting machines which are configured to both print and process the sheet elements into packaging elements or digital printing machines.

BACKGROUND

Converting machines are used in the production of packaging elements such as flat-packed and folding boxes. Sometimes, the same converting machine is configured to print, cut and crease, and fold the sheet to form a packaging element.

However, it is also common to use several types of converting machines when producing the packaging elements. For instance, a first machine will print the sheet substrate, and a second machine will cut the sheet to form a cut-to-shaped blank. Sometimes, the second machine may also glue and fold the blank.

A common module for these converting machines is a feeder module. The feeder module comprises a loading surface onto which a stack of sheets can be placed. The feeder module is configured to discharge the sheets one by one in a direction of transportation into the converting machine and at a precise timing. The feeder module further comprises a gauge which defines a clearance only allowing one sheet to enter into the converting machine at a time. On a downstream side of the feeder gauge, it is common to arrange a pair of feed rollers which nip the leading edge of the sheet pull the sheet out from the loading surface.

Examples of a feeder module provided with feed rollers are described in documents U.S. Pat. Nos. 3,907,278 and 5,074,539.

The converting machines are used for cardboards with different thicknesses. Typically, the thickness of the cardboard may vary between 0.7 and 15 mm.

The trajectory of the sheets differs for different thicknesses of cardboard sheets. When passing between different machine parts which grasp the sheet in an alternating way, there a risk that even with a small vertical distance between the sheet and the machine part, the front edge of the sheet is bent, or even warped. Carboard is stiff material and when it bends, permanent and visible bend marks and scratches may be formed.

SUMMARY

It is an object of the present invention to reduce the above-mentioned drawbacks of the prior art.

This object is solved by a feeder module according to claim 1.

According to a first aspect of the present invention, there is provided a feeder module for a converting machine, the feeder module comprising:

- a lower feeder assembly comprising a loading surface configured to receive a stack of sheets and a discharge conveyor, the discharge conveyor being configured to discharge the sheets in a direction of transportation through the converting machine,
- an upper feeder assembly comprising a gauge, wherein a distance between a vertical distal end of the gauge and the loading surface defines a clearance through which a lowermost positioned sheet in the stack can pass,
- a feed roll assembly comprising an upper feed roller and a lower feed roller, said feed roll assembly being located downstream of the gauge, characterized in that the lower feeder assembly comprises a displacement mechanism configured to displace the loading surface in the vertical direction, and wherein the feed roll assembly comprises a feed roll displacement mechanism configured to displace the lower feed roller in the vertical direction.

The invention is based on a realization that the sheet can be given a transportation path which in which the upper surface of each sheet is at a constant vertical position, regardless of feeder adjustments effectuated to accommodate for different sheet thickness in different production batches. By connecting the feeder loading surface and the lower feed roller to displacement mechanisms, it is possible to adjust to different thickness of cardboard.

Within the context of this application, the term "converting machine" includes machines which are only configured to print a sheet substrate, or converting machines which further comprise cutting and shaping modules such as rotary die-cutters, flatbed die-cutters, or slotting modules and folding modules.

In an embodiment, the upper feeder assembly and the upper feed roller are stationary arranged.

In an embodiment, the lower feed roller and the loading surface are mounted in a common chassis.

In an embodiment, the lower feed roller and the loading surface are mounted in different chassis.

In an embodiment, the feed roll displacement mechanism comprises a first displacement device and a second displacement device, and wherein the first displacement device is configured to displace the lower feed roller to a smaller distance than the second displacement device.

In an embodiment, the feeder displacement mechanism comprises a motor, an actuator and a converting element configured to translate a horizontal displacement into a vertical displacement of the lower feeder assembly.

In an embodiment, the actuator is a drive screw, and the converting element is a wedge-shaped converting element.

According to a second aspect of the present invention, there is provided a converting machine comprising a feeder module according to any one of the preceding claims, wherein a transfer unit is positioned downstream of the feed roll assembly, and wherein the transfer unit comprises drive elements provided having a contact surface configured to contact the sheets and vacuum apertures configured to apply suction against the upper side of the sheet, wherein the upper feed roller is aligned with the transportation elements in the transfer unit.

In an embodiment, the converting machine comprises a control unit configured to determine a required displacement of the loading surface and actuate the feeder displacement mechanism and the feed roll displacement mechanism to effectuate the required displacement.

BRIEF DESCRIPTION OF THE DRAWINGS

The invention will now be described with reference to the appended drawings, in which like features are denoted with the same reference numbers and in which.

DETAILED DESCRIPTION

Figure 1:
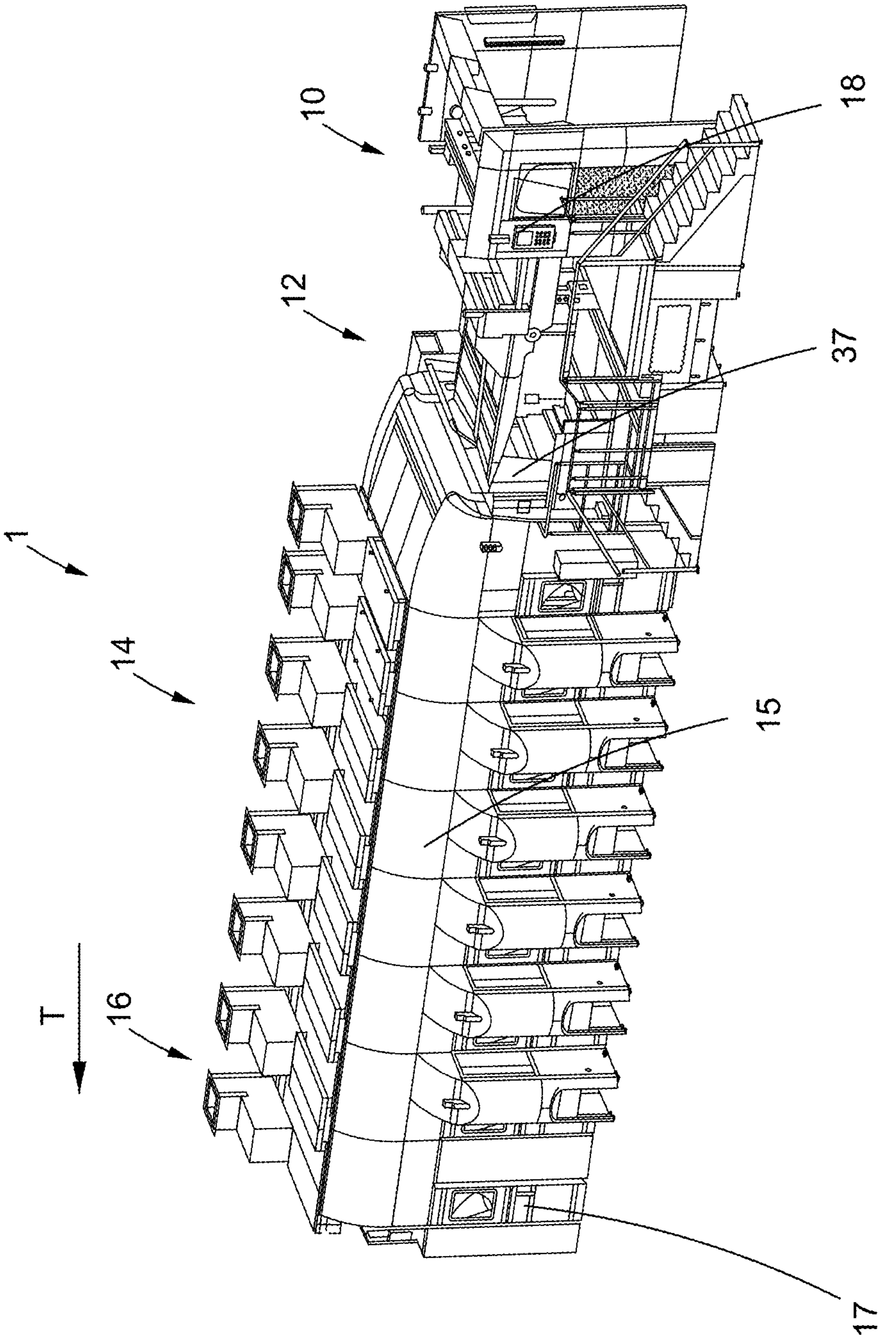
FIG. 1 is a schematic perspective view of a converting machine in the configuration of a flexographic printing press.

Referring to the figures and in particular to FIG. 1 which illustrates a converting machine 1 in the form of printing press machine. Even if not illustrated, the present invention can be used for other converting machines such as flatbed die-cutters, rotary die cutters or flexo-folder gluers which further comprise a converting unit comprising a slotter assembly or a rotary-die cutting assembly. These machines may be provided with the same feeder module which will be described in the following.

As illustrated in FIG. 1, the converting machine 1 may comprise successively in a direction of transportation T: a loader 10 for automatically loading stacks of sheets 2, a feeder module 12, a printing module 14 comprising plurality of printing units 15, and a delivery module 16 which may include a stacker device 17. Optionally, the converting machine 1 may further comprise a digital printing module (not illustrated).

A main operator interface 18 may also be provided in the proximity of the converting machine. The converting machine 1 may also comprise a bundler and a palletizer module.

Figure 2A:
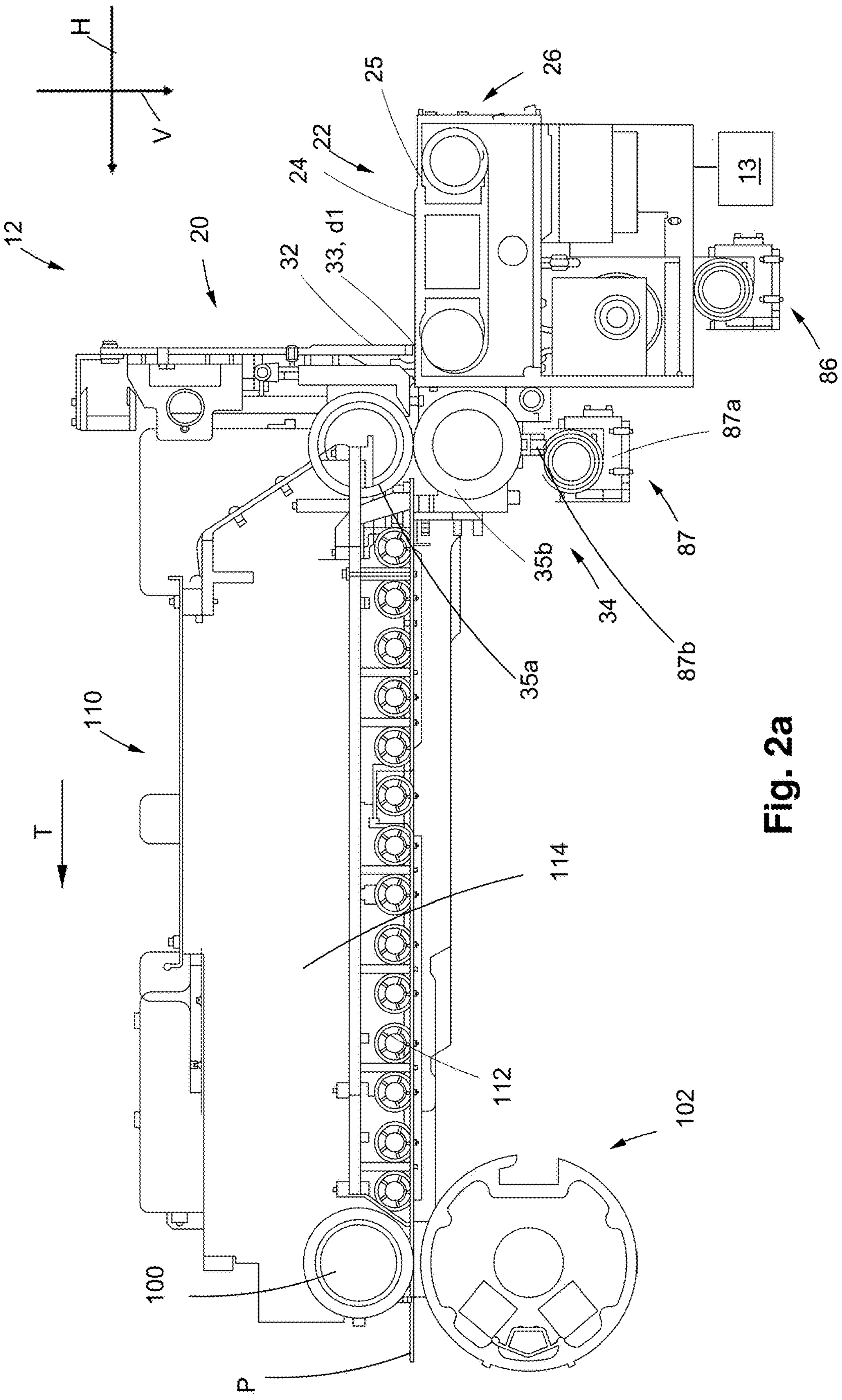
FIG. 2*a* is a schematic cross-sectional view of a feeder module according to an embodiment of the present invention.
Figure 2B:
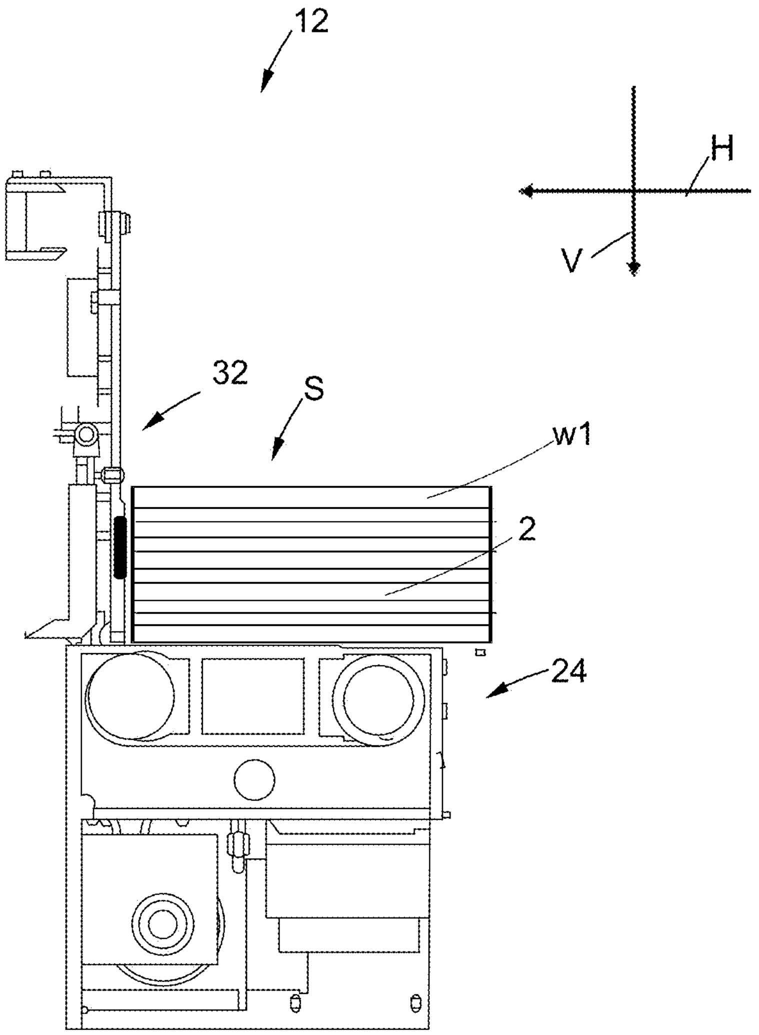
FIG. 2*b* is a schematic cross-sectional view of a feeder module with a stack of sheets.

As illustrated in FIGS. 2*a* and 2*b*, the feeder module 12 comprises an upper feeder assembly 20 and a lower feeder assembly 22. The upper feeder assembly 20 and the lower feeder assembly 22 are mounted to a common chassis 37.

Figure 3A:
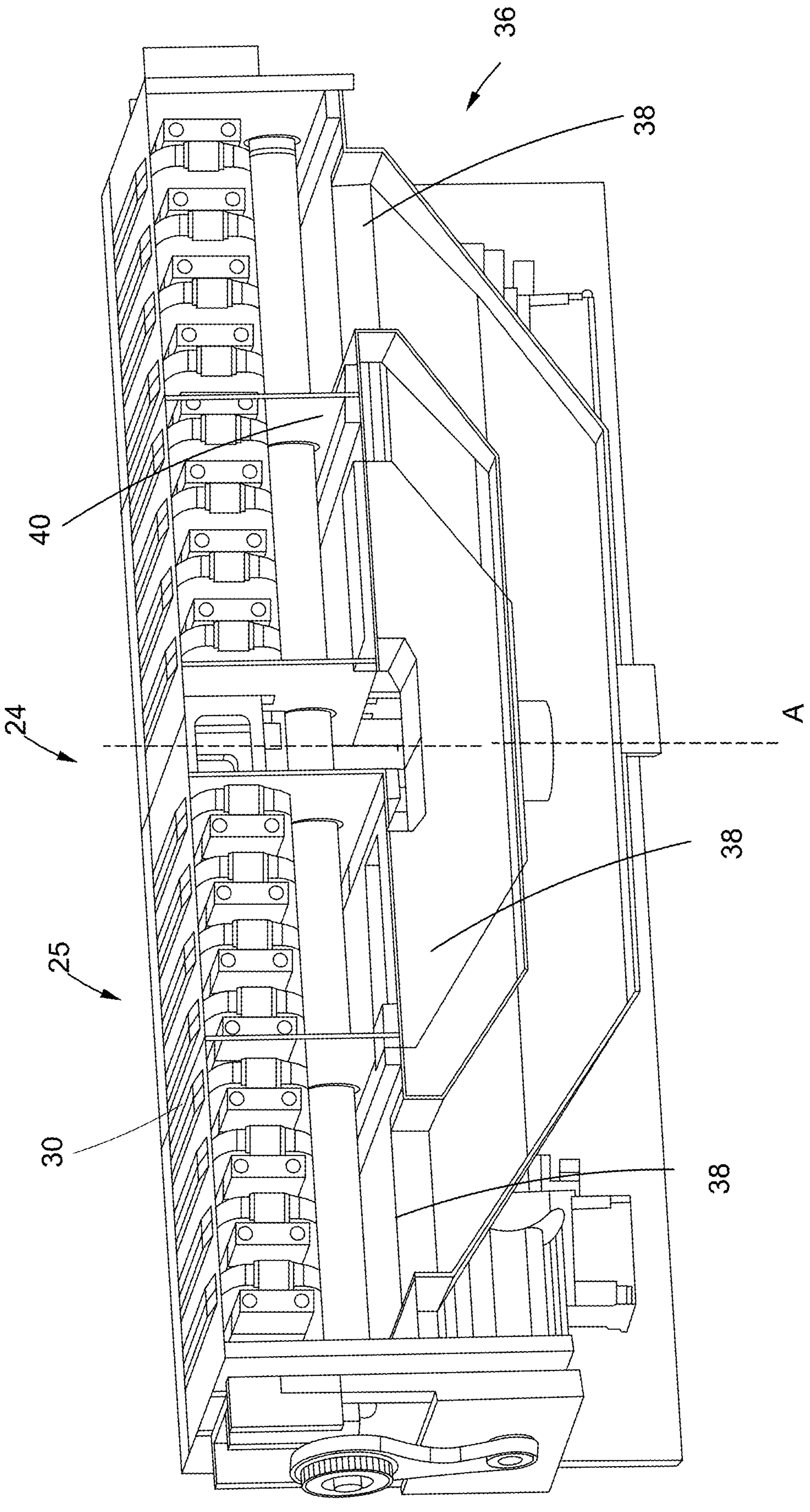
FIG. 3*a* is a schematic cross-sectional view of a loading surface of the feeder module of FIG. 2*a* and FIG. 2*b;*
Figure 5:
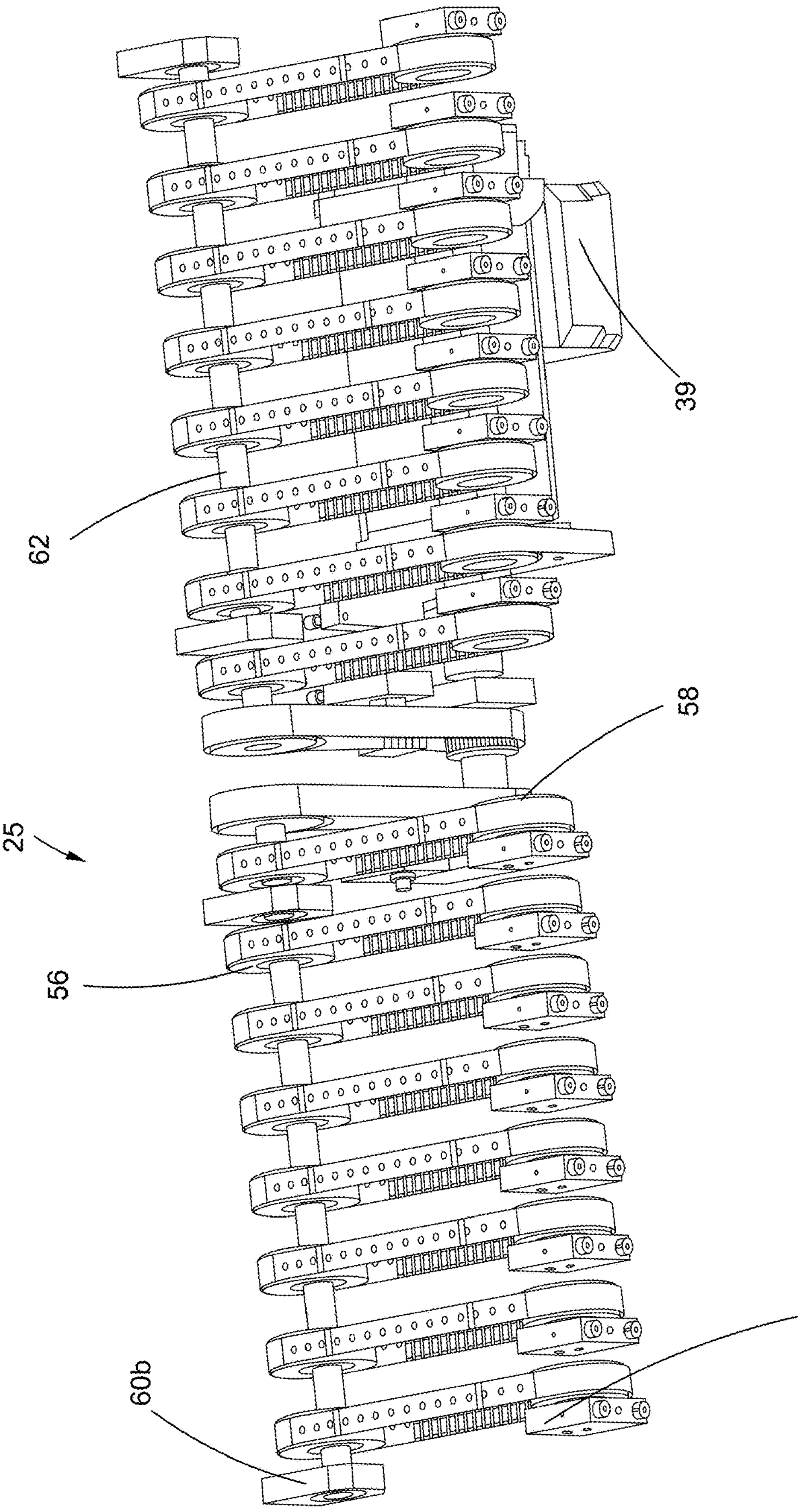
FIG. 5 is a partially cut-away of the loading surface and the discharge conveyor according to an embodiment of the present invention.

The lower feeder assembly 22 comprises a loading surface 24, and a discharge conveyor 25 configured to discharge the sheets 2 one by one into the converting machine 1 in the direction of transportation T. As best seen in FIGS. 3*a* and 5, the discharge conveyor 25 may comprise a plurality of drive elements 30 in the form of belt conveyors 30 arranged side by side. A motor 32 is configured to drive the belt conveyors 30 in motion. Alternatively, the loading surface 24 may be provided with a plurality of drive elements 30 in the form of rollers.

The upper feeder assembly 20 comprises a gauge 32. The gauge 32 has a distal vertical end 33 which is arranged at distance d1 from the loading surface 24. The distance d1 between the distal vertical end 33 and the loading surface 24 defines a clearance through which the lowermost positioned sheet 2 in the stack S can pass.

The loading surface 24 is a flat surface which is configured to receive stacks S of sheets 2. The stack of sheets S can be placed on the loading surface 24 by a loader module 10 as the one described in document EP2408698B1. The loading surface 24 is attached to the chassis 37 of the feeder module.

Figure 7:
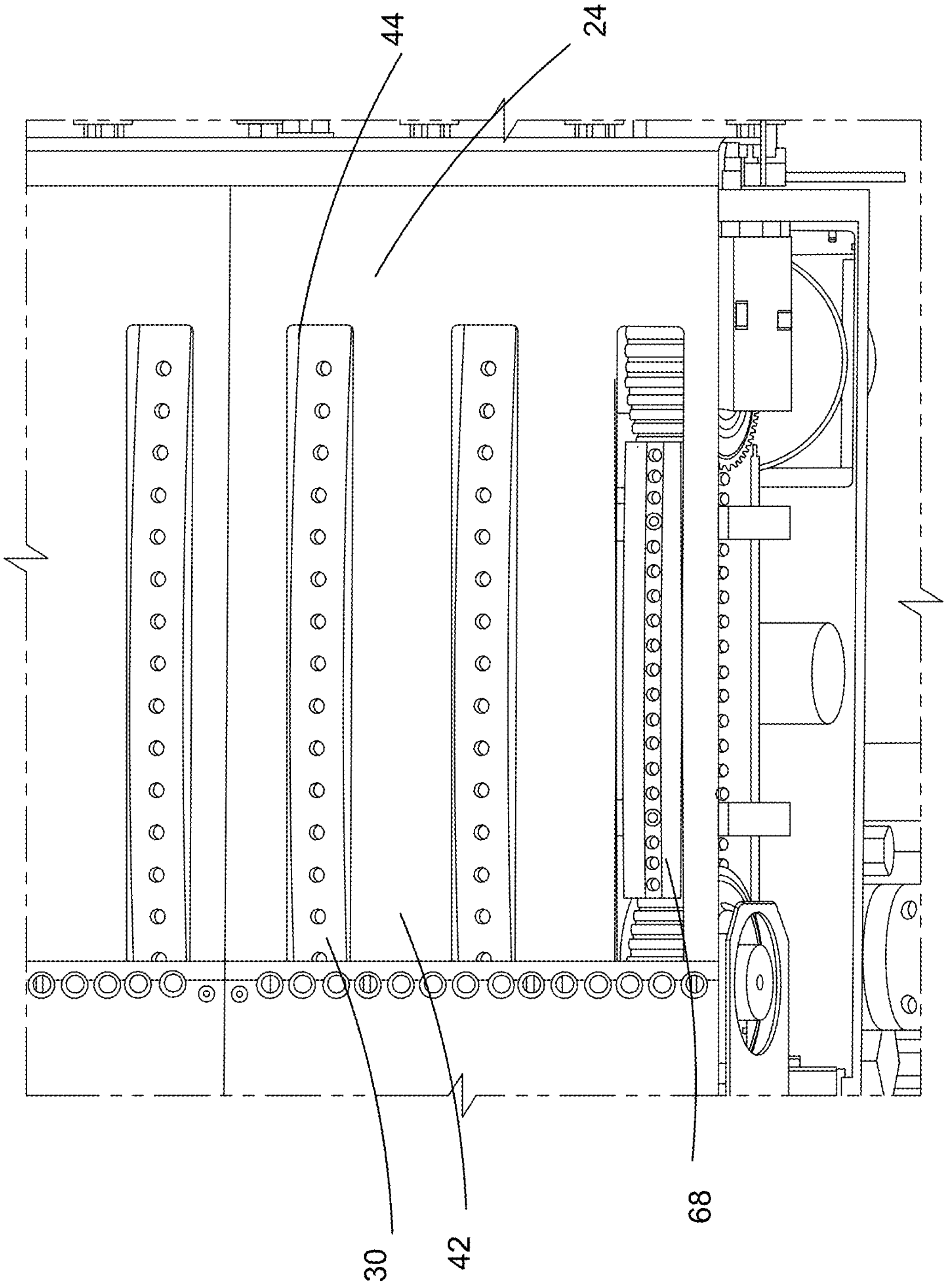
FIG. 7 is a top view of the discharge mechanism.

As illustrated in FIG. 7, the loading surface 24 may comprise a plurality of elongated surfaces 42. The elongated surfaces 42 are spaced apart from each other in the lateral direction L, such that a slot 44 is formed in-between each elongated surface 42. The belt conveyors 30 are located in the slots 44.

Figure 3B:
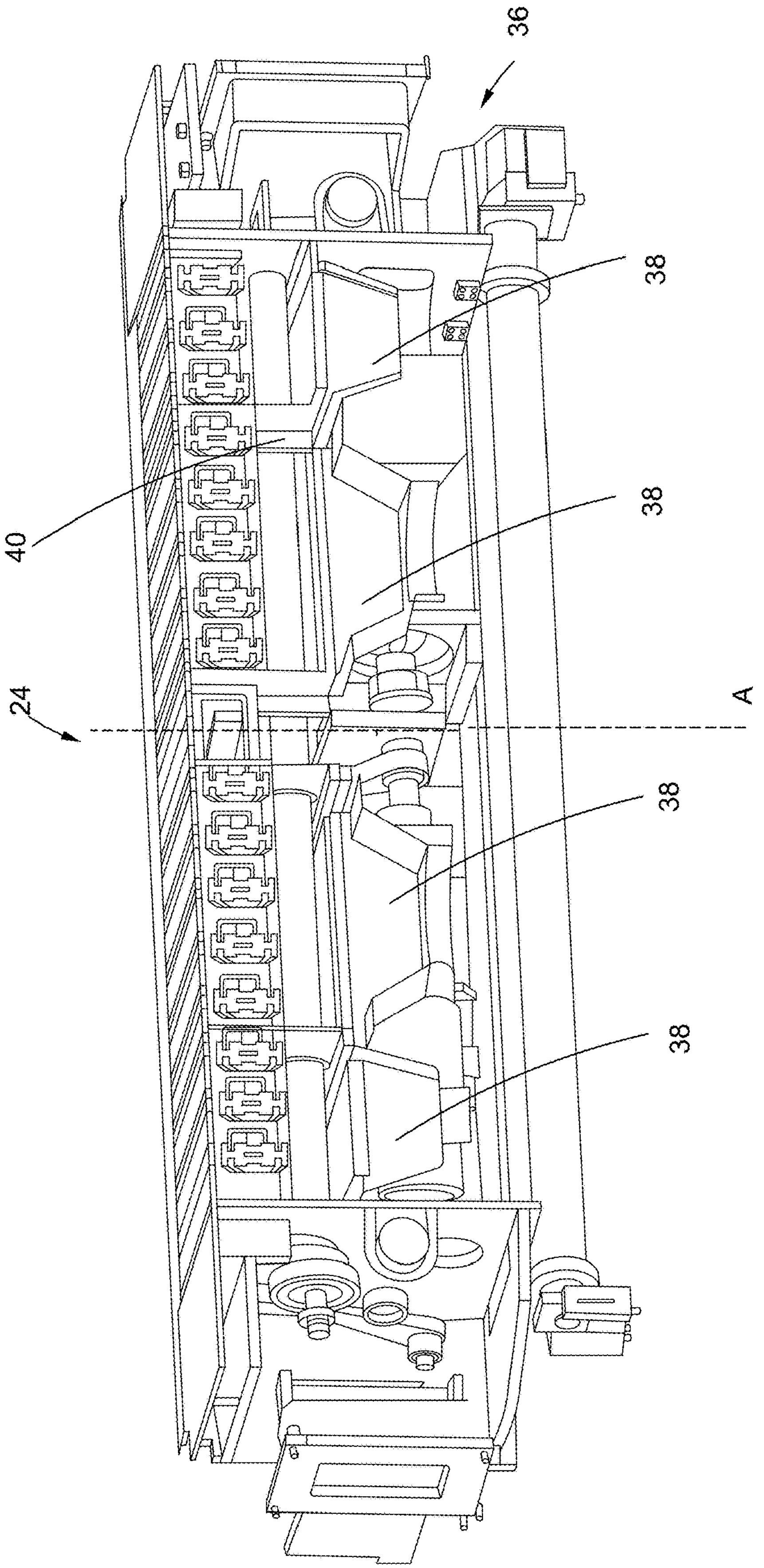
FIG. 3*b* is a schematic cross-sectional view of another embodiment of a loading surface of the feeder module of FIG. 2*a* and FIG. 2*b;*
Figure 4B:
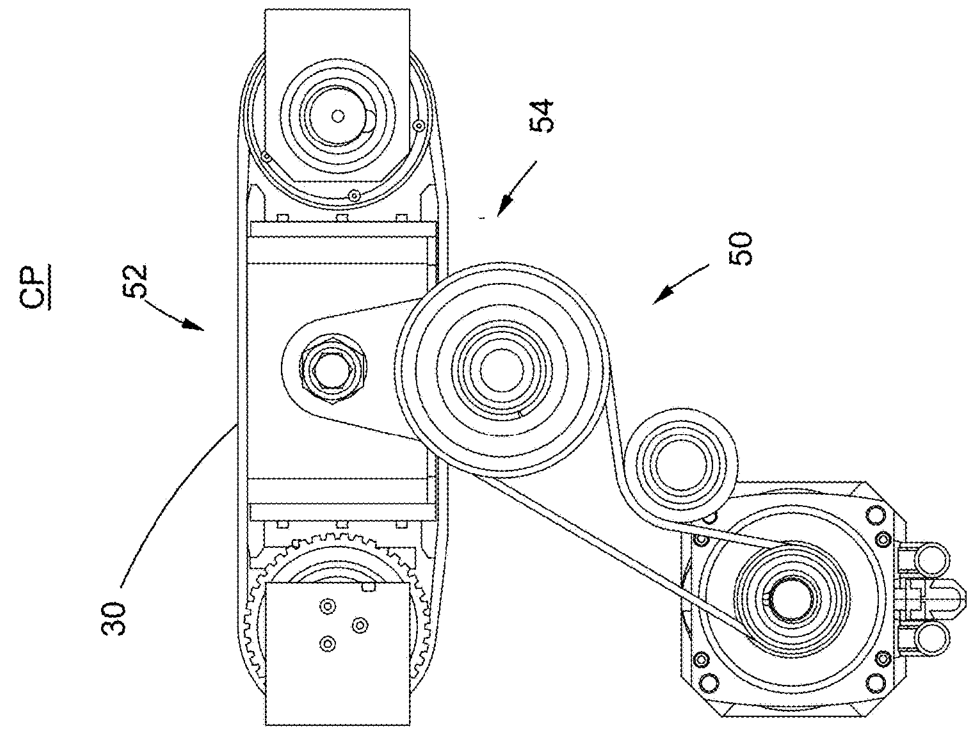
FIGS. 4*a* and 4*b* are side views of a discharge mechanism in a first position and second position, respectively.
Figure 4A:
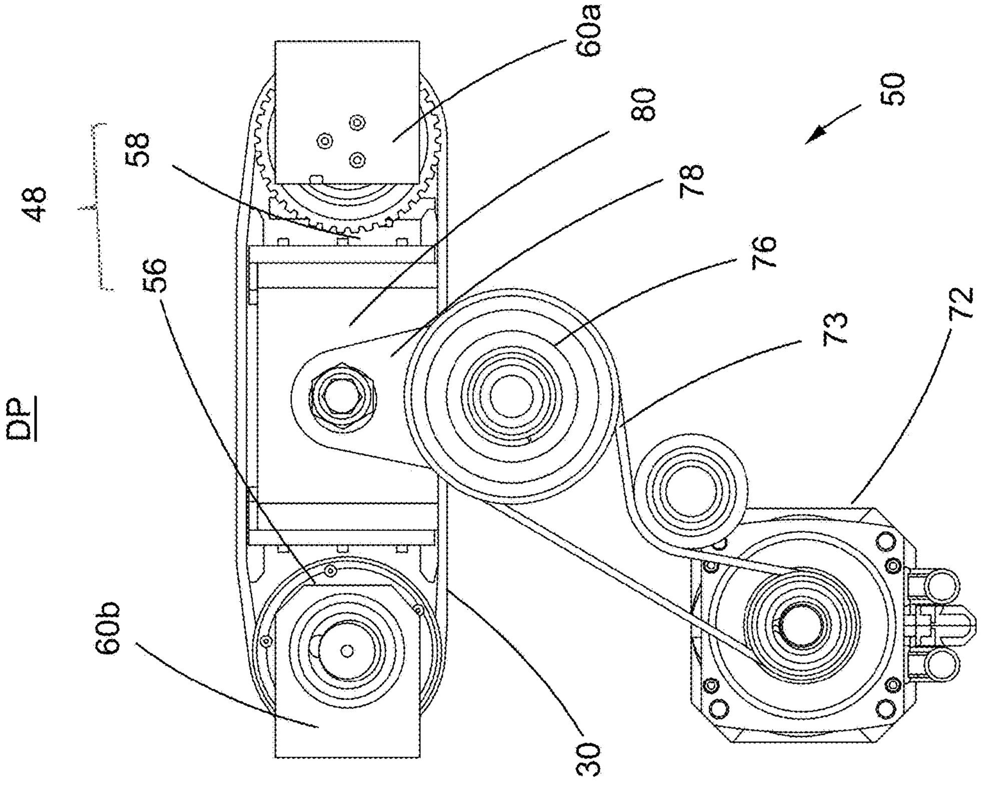

As best seen in FIGS. 3*a* and 3*b*, the belt conveyors 30 may be arranged in a suction box 36. The suction box 36 may comprise a plurality of compartments 38. The compartments 38 may be separated from each other by partition walls 40. Preferably, the partition walls 40 are arranged such that suction compartments 38 are symmetric in relation to a center axis A of the loading surface 24. In an embodiment, there may be two suction compartments 38, 38 located on each side of the center axis A. Each suction compartment 38, 38 may be connected to a separate vacuum pump (not illustrated). In another embodiment, there may be three suction compartments, in the form of a central suction compartment 38 and a first suction compartment 38 and a second suction compartment 38. The central suction compartment 38 may be connected to a first suction pump and the first and the second lateral suction boxes may be both connected to a common second suction pump.

Each belt conveyor 30 is provided with an upper contact surface 52 which is in contact with the bottom surface of the sheets 2 and a return portion 54 which is located vertically below the contact surface 52. The upper contact portion 52 of the belt conveyors 30 is thus exposed to the sheet 2 in the elongated slots 44.

A belt displacement mechanism 50 is configured to move the belts conveyors 30 in unison between a discharge position DP in which the contact surfaces 52 of the belt conveyors 30 are located vertically above the loading surface 24, and a clearing position CP in which the contact surfaces 52 of the belt conveyors 30 are located vertically below the loading surface 24. In the discharge position DP, the lowermost positioned sheet 2 in the stack S is brought into contact with the belt conveyors 30 which drive the sheet 2 forward in the direction of transportation T.

Each belt conveyor 30 is mounted onto a belt guiding mechanism 48. The belt guiding mechanism 48 comprises a drive roller 56 and an idle roller 58 around which the belt is mounted. The drive roller 56 and the idle roller 58 are rotatably attached to the chassis of the feeder module 12 in a first bracket 60*a* and a second bracket 60*b*.

The drive roller 56 may be connected to a common drive shaft 62 which extends through the center of all drive rollers 56. In such a way, all the belt conveyors 30 are driven in unison.

Preferably, the drive roller 56 and the idle roller 58 have the same diameter. In such a way, the trajectory of the belt conveyor is symmetric. The drive roller 56 and the idle roller 58 may be toothed and configured to engage with the inner dented surface of the belt conveyors 30.

Figure 8:
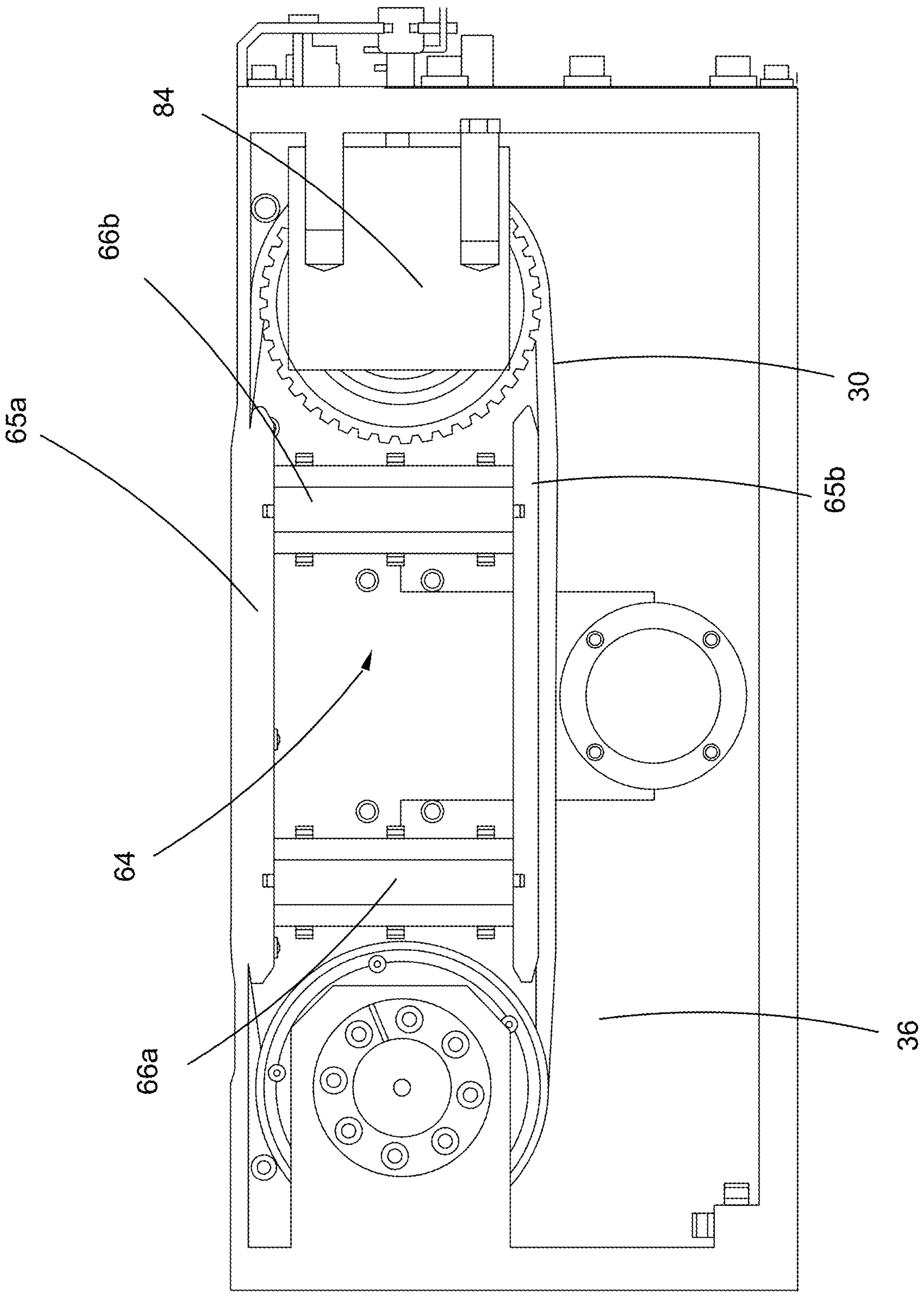
FIG. 8 is a schematic cross-sectional view of view of the discharge mechanism.

As best seen in FIG. 8, the belt displacement mechanism 50 comprises a displacement member 64 located inside an inner periphery of each belt conveyor 30. The displacement member 64 comprises an upper displacement surface 65*a* and a lower displacement surface 65*b*. The upper displacement surface 65*a* is configured to move the upper contact surface 52 of the belt conveyors 30 upwards. The lower displacement surface 65*b* of the displacement member 64 is configured to move the return portion 54 of the belt conveyor 30 vertically downwards.

The upper and lower displacement surfaces 65*a*, 65*b* are preferably parallel to each other. The upper and lower displacement surfaces 65*a*, 65*b* may be horizontal. The upper and lower displacement surfaces 65*a*, 65*b* are preferably interconnected via at least one vertical member 66*a*, 66*b*. However, preferably, a first vertical member 66*a* and a second vertical member 66*b* are provided. The at least one vertical member 66*a*, 66*b* may extend across the loading surface such as to interconnect all upper and lower displacement surfaces 65*a*, 65*b* of all belt conveyors 30.

At least the upper displacement surfaces 65*a* may be provided with apertures 68. In such a way, the airflow from the suction box 36 can flow through the displacement member 64. The upper displacement surfaces 65*a* may also be provided with a sliding surface configured to contact the belt conveyor 30. The sliding surface is a low friction surface, such as a smooth metallic surface.

The displacement mechanism 50 may comprise a motor 72, an eccentric shaft 76, toothed drive roller 74 a pulley 73, and an eccentric shaft bracket 78 connected to a bracket 80 of the displacement mechanism 64.

The upper and lower displacement surfaces 65*a*, 65*b* are positioned symmetrically with respect to the drive roller 56 and the idle roller 58. The displacement member 64 thus symmetrically supports the upper contact portion 52 and the return portion 54 of the belt conveyor 30. The up and down movement of the displacement member 64 is preferably at the same distance. This makes it possible to have the same variations in the length of the belt conveyors 30 on either side of the displacement member 64 and therefore to limit belt tension variations.

Referring back to FIGS. 1 and 2*a*, the upper and lower feeder assemblies 20, 22 are mounted to a chassis 37. The lower feeder assembly 22 is vertically movable in relation to the upper feeder assembly 20. This allows a modification of the distance d1 between the vertical distal end 33 of the gauge 32 and the loading surface 24. Hence, the distance d1 can be modified without moving the upper feeder assembly 20 and the gauge 32.

Figure 6:
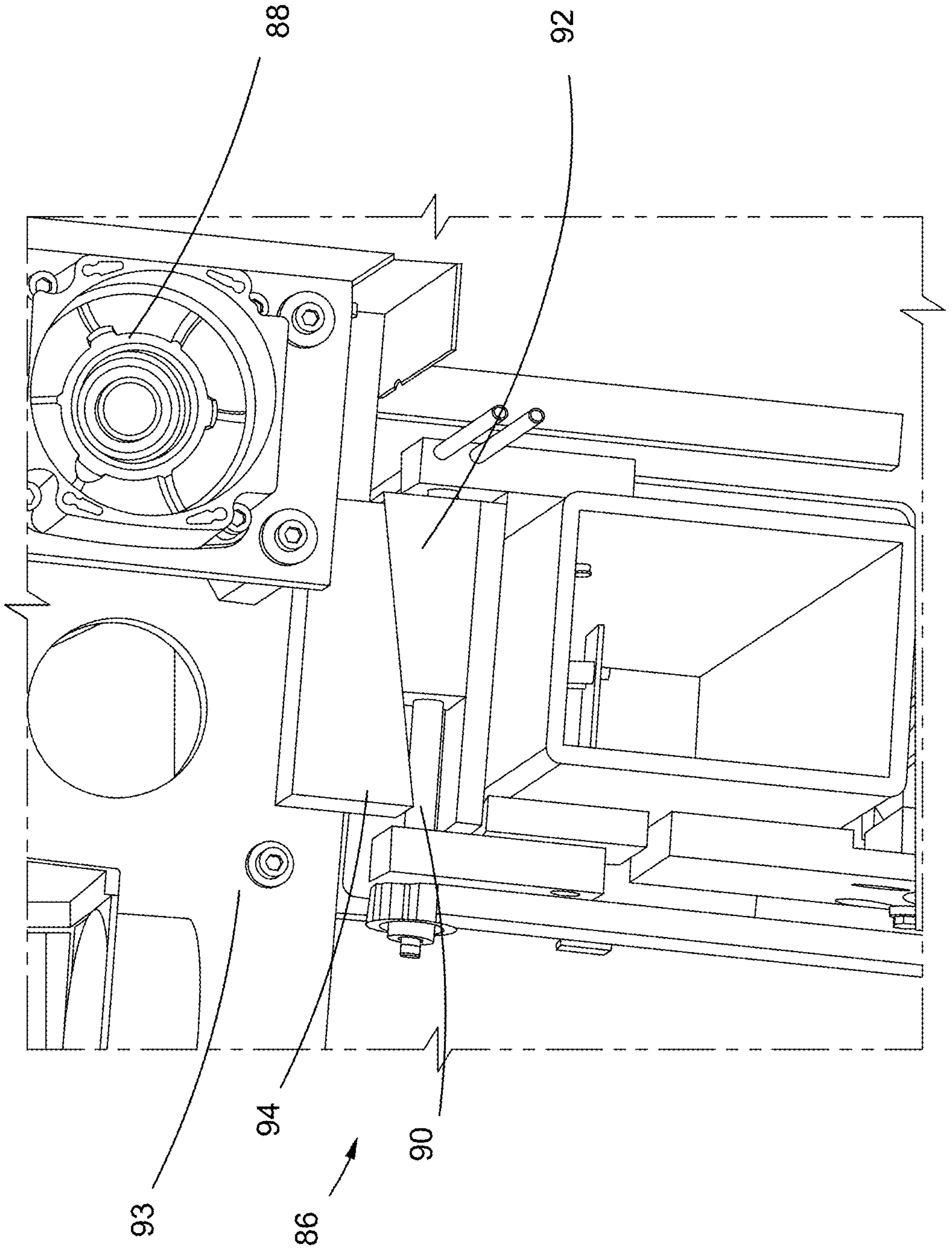
FIG. 6 is a cross-sectional view of a feeder displacement mechanism according to an embodiment of the invention.

The vertical displacement of the lower feeder assembly 22 is provided by a feeder displacement mechanism 86. As illustrated in the embodiment of FIG. 6, the feeder displacement mechanism 86 may comprise a motor 88, an actuator 90 and a converting element 92. The converting element 92 is configured to transform a horizontal displacement of the converting element 92 to a vertical displacement of the lower feeder assembly 22. The chassis 93 of the lower feeder assembly 22 is fixedly connected to a slider element 94 such that the lower feeder assembly 22 moves as the converting element 92 is horizontally displaced. This provides a stable and constant movement of the relatively heavy lower feeder assembly 22.

The feeder displacement mechanism 86 may comprise an actuator 90 in the form of at least one horizontal screw, and a wedge-shaped converting element 92. Preferably, there are two feeder displacement mechanisms 86 long the longitudinal length of the lower feeder assembly 22.

The chassis 93 of the lower feeder assembly 22 may thus comprise a first wedge element 92 and the lower feeder assembly may comprise a second wedge element 94. The wedge elements are provided with a sliding contact surface.

In alternative embodiments (not illustrated), the feeder displacement mechanism 86 may comprise a pair of vertical screws, or an eccentric drive shaft.

The feeder module 12 further comprises a feed roll assembly 34. The feed roll assembly 34 is located on a downstream side of the gauge 32 and is configured to grasp each sheet 2 and pull the sheet 2 from the loading surface 24. The feed roll assembly 34 comprises an upper feed roller 35*a* and a lower feed roller 35*b*.

The lower feed roller 35*b* may be fixedly attached to the lower feeder assembly 22 and configured to be displaced in unison with the loading surface 24.

Alternatively, the lower feed roller 35*b* may be mounted to a feed roll displacement mechanism 87. The feed roll displacement mechanism 87 is separate from the lower feeder assembly 22. The feed roll displacement mechanism 87 may be similar to the feeder displacement mechanism 86.

In an embodiment, the feed roll displacement mechanism 87 may comprise a first displacement device 87*a* configured to provide a first vertical displacement. The first vertical displacement may be between 0 and 30 mm. This first displacement device 87*a* may be similar to the feeder displacement mechanism 86. A second feed roll displacement device 87*b* is provided and is configured to provide a larger displacement than the first displacement device 87*a*. The second feed roll displacement device 87*b* provides a faster displacement of the lower feed roller 35*b*. The second displacement device 87*b* may be deployed in the case of paper jams or maintenance. The second displacement device 87*b* may comprise at least one, or preferably a plurality of hydraulic cylinders.

As illustrated in FIG. 2*a*, the first printing unit 15 after the feeder module 12 may comprise a flexographic printing assembly configured to print on a lower side of the sheet 2. The first printing unit 15 may thus comprise an anvil 100 arranged vertically above the printing cylinder 102. The anvil 100 may be stationary mounted in a chassis of the printing unit 15. In another (non-illustrated embodiment), the first printing unit 15 after the feeder module 12 may comprise a flexographic printing assembly configured to print on an upper side of the sheet 2. The first printing unit 15 may thus comprise an anvil arranged vertically below a printing cylinder. The printing cylinder may be stationary mounted in a chassis of the printing unit 15.

A transfer unit 110 is located between the feed roll assembly 35 and the first printing unit 15. The transfer unit 110 comprises drive elements 112 such as rollers or conveyor belts which are configured to drive the sheet 2 forward in the direction of transportation T. The drive elements 112 are preferably located in a suction box 114 provided with suction openings around the drive elements 112. The suction apertures are configured to make the sheet adhere to the drive elements 112. A vacuum suction pump is connected to the suction box. As the drive elements 112 are contacting the sheet 2, the transportation path P in the transfer unit 110 is limited by an upper boundary by the surface of the drive elements 112.

The transportation path P of the sheet 2 is defined by the clearance provided by gauge 32, the clearance between the upper and lower feed rollers 35*a*,35, the transportation surface in the transfer unit 110, and the clearance between the printing cylinder 102 and the anvil 100.

While the sheet 2 is conveyed along the transportation path P, the horizontal position of the sheet's upper surface is defined by the distal vertical end 33 of the gauge 32, the upper feed roller 35*a*, the transportation surface in the transfer unit 110, and the upper cylinder in the flexographic printing unit 15.

By maintaining this upper boundary of the transportation path P horizontal, damages to the sheets 2 can be avoided.

According to the present invention, the upper fed roller 35*a* is maintained in a horizontally aligned position with the transportation surface in the transfer unit 110. The movable loading surface 24 and the lower feed roller 35*b* allows adjustments for different sheet thicknesses w1 while keeping the upper boundary of the transportation path P constant. The sheet thicknesses w1 is the height of the sheet in the vertical direction V.

As the thickness w1 of the sheets 2 changes between different production batches, the vertical position of the loading surface 24 is modified by a displacement provided by the motor 88.

The feeder module 12 may further comprise a control unit 13 configured to determine a required vertical displacement of the loading surface 24. Optionally the control unit 13 may also be configured to determine a required vertical displacement of the lower feed roller 35*b*. The displacement may correspond to the difference in sheet thickness w1 from of the sheets in a first production batch and the sheets in a second production batch.

The invention claimed is:

1. A feeder module for a converting machine, the feeder module comprising:

a lower feeder assembly comprising a loading surface configured to receive a stack of sheets and a discharge conveyor, the discharge conveyor being configured to discharge the sheets in a direction of transportation through the converting machine, an upper feeder assembly comprising a gauge, wherein a distance between a vertical distal end of the gauge and the loading surface defines a clearance through which a lowermost positioned sheet in the stack can pass, and a feed roll assembly comprising an upper feed roller and a lower feed roller, said feed roll assembly being located downstream of the gauge, wherein the lower feeder assembly comprises a feeder displacement mechanism configured to displace the loading surface in the vertical direction, and wherein the feed roll assembly comprises a feed roll displacement mechanism configured to displace the lower feed roller in the vertical direction, wherein the feeder module comprises a control unit configured to determine a required vertical displacement of one or more of the loading surface or the lower feed roller in relation to a sheet roller thickness and to actuate one or more of the feeder displacement mechanism or the feed roll displacement mechanism to effectuate the required displacement.

2. The feeder module according to claim 1, wherein the upper feeder assembly and the upper feed roller are arranged to be stationary.

3. The feeder module according to claim 1, wherein the lower feed roller and the loading surface are mounted in a common chassis.

4. The feeder module according to claim 1, wherein the lower feed roller and the loading surface are mounted in different chassis.

5. The feeder module according to claim 1, wherein the feed roll displacement mechanism comprises a first displacement device and a second displacement device, and wherein the first displacement device is configured to displace the lower feed roller to a smaller distance than the second displacement device.

6. The feeder module according to claim 1, wherein the feeder displacement mechanism comprises a motor, an actuator and a converting element configured to translate a horizontal displacement into a vertical displacement of the lower feeder assembly.

7. The feeder module according to claim 6, wherein the actuator is a drive screw, and the converting element is a wedge-shaped converting element.

8. A converting machine comprising:

the feeder module according to claim 1, wherein a transfer unit is positioned downstream of the feed roll assembly, and wherein the transfer unit comprises drive elements provided having a contact surface configured to contact the sheets and vacuum apertures configured to apply suction against the upper side of the sheet, wherein the upper feed roller is aligned with the transportation elements in the transfer unit.

* * * * *